UNITED STATES PATENT OFFICE.

ERNEST DEACON BELL, OF LONDON, ENGLAND.

PAPAINIZED CHEESE PASTE AND METHOD OF MAKING SAME.

SPECIFICATION forming part of Letters Patent No. 683,429, dated October 1, 1901.

Application filed November 26, 1900. Serial No. 37,811. (No specimens.)

*To all whom it may concern:*

Be it known that I, ERNEST DEACON BELL, residing at 10 Museum street, London, W. C., in the county of Middlesex, England, have invented certain new and useful Improvements in Papainized Cheese Paste and Method of Making Same; and I do hereby declare the following to be a full, clear, and exact description of the invention, such as will enable others skilled in the art to which it appertains to make and use the same.

This invention relates to a new and useful invention in alimentary preparations; and it consists in the process hereinafter described, whereby a preparation of cheese is produced, such cheese being rendered easy of digestion and richer in flavor than heretofore.

Cheese, although a substance of considerable dietetic value, has never been so widely used as it should be, owing to its indigestibility. This results principally from the coagulated condition of its casein and the consequent closeness of texture, which makes it extremely difficult for the digestive juices to permeate it.

My invention has for its object a certain process whereby the casein is dissolved and peptonized and the cheese thus made usable even by persons of weak digestion, while at the same time it is greatly improved in flavor.

In carrying my invention into practice I take cheese cut into small pieces by any suitable machinery or device, pass it through rollers to crush it to a soft broken mass, and form a paste by the admixture of an approximately equal weight of water or milk, preferably milk. Ferment of papain to the extent of from four to five grains to each pound of cheese is dissolved in the liquid, while also I add thereto alkali, preferably the carbonate or bicarbonate of potash or soda, to the extent of from one to one and a half per cent. the weight of cheese used. The said ferment of papain and alkali are added to the liquid before the latter is mixed with the cheese.

The papainized and alkalized cheese paste produced in the foregoing manner is next cooked over a slow fire or its equivalent until the cheese is dissolved, after which the mixture is removed from the fire or other heating medium and either used at once or else inclosed in tins, jars, bottles, edible skins, or other suitable receptacles.

If desired, rich fat, eggs, and flavoring substances may be introduced into the mixture in suitable proportions.

What I claim as my invention, and desire to secure by Letters Patent, is—

1. The process herein described for producing an alimentary preparation possessing the properties described, which consists in crushing cheese to a soft, broken mass, mixing said mass with alkaline liquid containing about five grains of papain to each pound of cheese used, and cooking the papainized cheese paste for a suitable period, substantially as specified.

2. The product produced by the herein-described process, said product consisting of a papainized, alkalized, flavored and cooked cheese paste, the albumen of which is in the converted form of peptone, substantially as specified.

In testimony whereof I hereunto affix my signature in the presence of two witnesses.

ERNEST DEACON BELL.

Witnesses:
GEORGE ISAAC BRIDGES,
J. J. SAUNDERS.